United States Patent
Kagarlitsky et al.

(10) Patent No.: US 12,020,363 B2
(45) Date of Patent: Jun. 25, 2024

(54) SURFACE TEXTURING FROM MULTIPLE CAMERAS

(71) Applicant: TETAVI LTD., Ramat Gan (IL)

(72) Inventors: Vsevolod Kagarlitsky, Ramat Gan (IL); Shirley Keinan, Tel Aviv (IL); Michael Birnboim, Holon (IL); Michal Heker, Tel Aviv (IL); Gilad Talmon, Tel Aviv (IL); Michael Tamir, Tel Aviv (IL)

(73) Assignee: TETAVI LTD., Ramat Gan (IL)

( * ) Notice: Subject to any disclaimer, the term of this patent is extended or adjusted under 35 U.S.C. 154(b) by 102 days.

(21) Appl. No.: 17/706,563

(22) Filed: Mar. 28, 2022

(65) Prior Publication Data
US 2022/0309733 A1    Sep. 29, 2022

Related U.S. Application Data
(60) Provisional application No. 63/167,126, filed on Mar. 29, 2021.

(51) Int. Cl.
| | |
|---|---|
| G06T 15/04 | (2011.01) |
| G06T 7/13 | (2017.01) |
| G06T 7/194 | (2017.01) |
| G06T 7/514 | (2017.01) |
| G06T 7/60 | (2017.01) |

(Continued)

(52) U.S. Cl.
CPC .......... *G06T 15/04* (2013.01); *G06T 7/13* (2017.01); *G06T 7/194* (2017.01); *G06T 7/514* (2017.01); *G06T 7/60* (2013.01); *G06T 7/70* (2017.01); *G06T 7/90* (2017.01); *G06T 17/20* (2013.01); *G06T 2200/08* (2013.01); *G06T 2207/10016* (2013.01); *G06T 2207/20221* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 8,384,714 B2 | 2/2013 | De Aguiar et al. | |
| 9,171,402 B1 * | 10/2015 | Allen | G06T 19/003 |

(Continued)

FOREIGN PATENT DOCUMENTS

| | | |
|---|---|---|
| WO | 2018234258 A1 | 12/2018 |
| WO | 2020055406 A1 | 3/2020 |

OTHER PUBLICATIONS

Written opinion for PCT/IL2022/050338 dated Jul. 10, 2022.
(Continued)

*Primary Examiner* — Anh-Tuan V Nguyen
(74) *Attorney, Agent, or Firm* — The Roy Gross Law Firm, LLC; Roy Gross

(57) ABSTRACT

System and method for texturing a 3D surface using 2D images sourced from a plurality of imaging devices. System and method for applying a realistic texture to a model, based on texture found in one or more two-dimensional (2D) images of the object, with the texture covering the entire 3D model even if there are portions of the object that were invisible in the 2D image. System and method which does not require machine learning, is not incapable of blending between images, and which is not incapable of filling in portions of a 3D model that are invisible in the 2D image.

15 Claims, 5 Drawing Sheets

(51) Int. Cl.
*G06T 7/70* (2017.01)
*G06T 7/90* (2017.01)
*G06T 17/20* (2006.01)

(56) References Cited

U.S. PATENT DOCUMENTS

| | | |
|---|---|---|
| 9,317,954 B2 | 4/2016 | Li et al. |
| 10,796,480 B2 | 10/2020 | Chen et al. |
| 10,818,064 B2 | 10/2020 | Wang et al. |
| 10,559,126 B2 | 11/2020 | Bouazizi et al. |
| 2014/0132601 A1 | 5/2014 | Raghoebardayal et al. |
| 2015/0178988 A1 | 6/2015 | Montserrat Mora et al. |
| 2015/0243069 A1 | 8/2015 | Knoblauch et al. |
| 2016/0231254 A1* | 8/2016 | Pirot .................. G01N 21/9054 |
| 2016/0232709 A1* | 8/2016 | Videen ................... G06T 17/00 |
| 2018/0144555 A1* | 5/2018 | Ford ....................... G06T 15/20 |
| 2019/0068955 A1 | 2/2019 | Nakazato |
| 2019/0371080 A1* | 12/2019 | Sminchisescu ......... G06T 17/20 |
| 2020/0019041 A1* | 1/2020 | Moltaji ................... G06T 17/20 |
| 2020/0160586 A1* | 5/2020 | Walls ...................... G06T 15/04 |
| 2020/0167995 A1 | 5/2020 | Hare et al. |
| 2020/0175702 A1* | 6/2020 | Morisawa ................. G06T 7/55 |
| 2022/0180545 A1* | 6/2022 | Mizuno ................. G06T 7/579 |
| 2022/0321798 A1* | 10/2022 | Li .......................... H04N 23/64 |
| 2022/0329770 A1* | 10/2022 | Sugano ................. G06T 19/003 |

OTHER PUBLICATIONS

Search strategy for PCT/IL2022/050338 dated Jul. 3, 2022.
International search report for PCT/IL2022/050338 dated Jul. 10, 2022.

* cited by examiner

SURFACE TEXTURING FROM MULTIPLE CAMERAS

CROSS-REFERENCE TO RELATED APPLICATIONS

This application claims the benefit of priority of U.S. Provisional Patent Application No. 63/167,126, filed Mar. 29, 2021, the contents of which are incorporated herein by reference in their entirety.

FIELD OF THE INVENTION

The present invention generally pertains to a system and method for texturing a 3D surface using 2D images sourced from a plurality of imaging devices.

BACKGROUND OF THE INVENTION

Much work has been done on applying texture to three dimensional (3D) software models of objects. Of particular interest is applying a realistic texture to a model, based on texture found in one or more two-dimensional (2D) images of the object, with the texture covering the entire 3D model even if there are portions of the object that were invisible in the 2D image, a task that is both algorithmically difficult and computationally intensive.

U.S. Pat. No. 10,818,064 teaches techniques related to estimating accurate face shape and texture from an image having a representation of a human face are discussed. Such techniques may include determining shape parameters that optimize a linear spatial cost model based on 2D landmarks, 3D landmarks, and camera and pose parameters, determining texture parameters that optimize a linear texture estimation cost model, and refining the shape parameters by optimizing a nonlinear pixel intensity cost function.

However, the technique relates only to images of the face, there is no teaching of how to match or blend images taken at different angles, nor is there teaching of how to fill in portions of a 3D model that were invisible in the 2D image.

U.S. Pat. No. 10,559,126 teaches a method and apparatus for encoding, decoding and rendering 3D media content. The apparatus includes a communication interface configured to receive a multimedia stream, and one or more processors operably coupled to the communication interface, the one or more processors configured to parse the multimedia stream into 2D video bit streams including geometry frames and texture frames, 2D to 3D conversion metadata for rendering 3D points from 2D frames, and scene description metadata describing 6 degree of freedom (6DoF) relationships among objects in a 6DoF scene, decode the 2D video streams including geometry data and texture data to generate 2D pixel data, covert the 2D pixel data into 3D voxel data using the 2D to 3D conversion metadata; and generate the 6DoF scene from 3D voxel data using the scene description metadata.

However, there is no teaching of how to match or blend images taken at different angles, nor is there teaching of how to fill in portions of a 3D model that were invisible in the 2D image.

U.S. Pat. No. 8,384,714 discloses a variety of methods, devices and storage mediums for creating digital representations of figures. According to one such computer implemented method, a volumetric representation of a figure is correlated with an image of the figure. Reference points are found that are common to each of two temporally distinct images of the figure, the reference points representing movement of the figure between the two images. A volumetric deformation is applied to the digital representation of the figure as a function of the reference points and the correlation of the volumetric representation of the figure. A fine deformation is applied as a function of the coarse/volumetric deformation. Responsive to the applied deformations, an updated digital representation of the figure is generated.

However, U.S. Pat. No. 8,384,714 finds reference points common to more than one temporally distinct image and applies volumetric deformation to transform the model from one time point to a subsequent time point in order to generate a model that moves with time. No manipulation or enhancement is taught.

U.S. Patent Application Publication No. US2015/0178988 teaches a method for generating a realistic 3D reconstruction model for an object or being, comprising:
a) capturing a sequence of images of an object or being from a plurality of surrounding cameras;
b) generating a mesh of said an object or being from said sequence of images captured;
c) creating a texture atlas using the information obtained from said sequence of images captured of said object or being;
d) deforming said generated mesh according to higher accuracy meshes of critical areas; and
e) rigging said mesh using an articulated skeleton model and assigning bone weights to a plurality of vertices of said skeleton model; the method comprises generating said 3D reconstruction model as an articulation model further using semantic information enabling animation in a fully automatic framework.

However, US20150178988 requires a predetermined articulated skeleton model. No manipulation or enhancement is taught.

U.S. Pat. No. 9,317,954 teaches techniques for facial performance capture using an adaptive model. For example, a computer-implemented method may include obtaining a three-dimensional scan of a subject and a generating customized digital model including a set of blend shapes using the three-dimensional scan, each of one or more blend shapes of the set of blend shapes representing at least a portion of a characteristic of the subject. The method may further include receiving input data of the subject, the input data including video data and depth data, tracking body deformations of the subject by fitting the input data using one or more of the blend shapes of the set, and fitting a refined linear model onto the input data using one or more adaptive principal component analysis shapes.

However, U.S. Pat. No. 9,317,954 teaches a method where the initial image(s) are 3D images. The blendshapes are predetermined shapes that can be combined with the initial images. No infill is taught for portions of the 3D model invisible in the initial image(s).

U.S. Pat. No. 10,796,480 teaches a method of generating an image file of a personalized 3D head model of a user, the method comprising the steps of: (i) acquiring at least one 2D image of the user's face; (ii) performing automated face 2D landmark recognition based on the at least one 2D image of the user's face; (iii) providing a 3D face geometry reconstruction using a shape prior; (iv) providing texture map generation and interpolation with respect to the 3D face geometry reconstruction to generate a personalized 3D head model of the user, and (v) generating an image file of the personalized 3D head model of the user. A related system and computer program product are also provided.

However, U.S. Ser. No. 10/796,480 requires "shape priors"—predetermined ethnicity-specific face and body shapes—to convert the automatically-measured facial features into an accurate face. Furthermore, either manual intervention or multiple images are needed to generate an acceptable 3D model of the body.

It is therefore a long felt need to provide a system which does not require machine learning, is not incapable of blending between images, and which is not incapable of filling in portions of a 3D model that are invisible in the 2D image.

SUMMARY OF THE INVENTION

It is an object of the present invention to disclose a system for texturing a surface using 2D images sourced from a plurality of imaging devices.

It is another object of the present invention to disclose a method for a generating at least one textured three-dimensional (3D) model from a set of two-dimensional (2D) images, comprising steps of:
  providing at least one 3D model, said 3D model comprising a set of sub-surfaces, said set of sub-surfaces defining a surface of the model;
  determining, for each image in said set of 2D images, a set of foreground pixels, said set of foreground pixels corresponding to a visible part of said surface;
  determining, in each image, for each foreground pixel in said set of foreground pixels, a score, and generating a set of scores;
  for each element on said at least one 3D model, assigning a texture to said element based on said set of scores.

It is another object of the present invention to disclose the method as described above, wherein, for each image in said set of 2D images, said set of foreground pixels comprises a set of units, each unit comprising a visible portion of a sub-surface.

It is another object of the present invention to disclose the method as described above, additionally comprising a step of selecting said unit from the group consisting of: a face, a hand, an arm, a leg, a head, a torso, skin, clothing, a shirt, a skirt, a pair of pants, a pair of shorts, a pair of leggings, hair and any combination thereof.

It is another object of the present invention to disclose the method as described above, additionally comprising a step of, for each imaging device, determining a pixel score for each said foreground pixel in each of said images, said pixel score determined, for each said foreground pixel i, from a member of a scoring group consisting of an angle $A_i$, a geometric quality $Q_i$, an edge $E_i$, a distance $D_i$, a specularity value $S_i$ a sub-surface group $G_i$ and any combination thereof.

It is another object of the present invention to disclose the method as described above, additionally comprising a step of, for each said foreground pixel in each said image, determining said angle $A_i$ as an angle between a normal to the surface and a camera optic axis of an imaging device generating said image, generating a set of angles $\{A_i\}$.

It is another object of the present invention to disclose the method as described above, additionally comprising a step of, for each imaging device and each surface, determining said geometric quality measure $Q_i$ by combining a measure of a closeness of the surface to a point-cloud with a density of the point-cloud and with a quality measure of the point-cloud, generating a set of geometric quality measures $\{Q_i\}$.

It is another object of the present invention to disclose the method as described above, additionally comprising a step of identifying at least one edge between sub-surfaces, generating said set of edges $\{E_i\}$.

It is another object of the present invention to disclose the method as described above, additionally comprising a step of, for each said foreground pixel, calculating said distance $D_i$ between said foreground pixel and a nearest edge in the set of edges $\{E_i\}$, generating a set of distances $\{D_i\}$.

It is another object of the present invention to disclose the method as described above, additionally comprising a step of, for each said foreground pixel, calculating said specularity value $\{S_i\}$.

It is another object of the present invention to disclose the method as described above, additionally comprising a step of generating said set of sub-surface groups $\{G_i\}$.

It is another object of the present invention to disclose the method as described above, additionally comprising a step of generating, for each element in said model, an element score, said element score determined from said pixel score for each of said foreground pixels with location corresponding to a location of said element.

It is another object of the present invention to disclose the method as described above, additionally comprising a step of receiving said set of 2D images, said set of 2D images comprising a member of the group consisting of a plurality of 2D images, a sequence of 2D images and any combination thereof.

It is another object of the present invention to disclose the method as described above, additionally comprising a step of selecting said providing of said at least one 3D model from the group consisting of: from a plurality of 2D images, from a single 2D image, from a downloaded 3D model, from a streamed 3D model and any combination thereof.

It is another object of the present invention to disclose the method as described above, additionally comprising a step of determining at least one model sub-surface of said surface of said 3D model. It is another object of the present invention to disclose the method as described above, additionally comprising a step of determining at least one sub-surface edge for each of said at least one sub-surface.

It is another object of the present invention to disclose the method as described above, additionally comprising a step of for each sub-surface edge, generating a set of sub-surface edge pixels.

It is another object of the present invention to disclose the method as described above, additionally comprising a step of determining a score for each said foreground pixel of said surface visible in each of said plurality of said 2D images.

It is another object of the present invention to disclose the method as described above, additionally comprising a step of determining at least one image edge, for each of said at least one best image. It is another object of the present invention to disclose the method as described above, additionally comprising a step of for each at least one surface edge, generating a set of image edge pixels.

It is another object of the present invention to disclose the method as described above, additionally comprising a step of generating a set of edge pixels, said set of edge pixels comprising said set of image edge pixels and said set of sub-surface edge pixels.

It is another object of the present invention to disclose the method as described above, additionally comprising a step of determining a geodesic distance between each said foreground pixel in each of said plurality of said 2D images and each pixel in an edge pixel group consisting of said set of image edge pixels, said sub-surface edge pixels and any combination thereof.

It is another object of the present invention to disclose the method as described above, additionally comprising steps of, for each said foreground pixel in each of said plurality of said 2D images, if said geodesic distance is greater than a predetermined value, setting a surface texture of a location on said surface to which said foreground pixel maps to be a texture of a pixel with the highest score; and, if said geodesic distance is less than a predetermined value, determining a set of local pixels, a local pixel being a member of said edge pixel group having said geodesic distance less than a predetermined value, and setting said surface texture of a location on said surface to which said foreground pixel maps to a weighted average of textures of said set of local pixels.

It is another object of the present invention to disclose the method as described above, additionally comprising steps of generating a set of in-element pixels, each of said in-element pixels being a pixel with location mapping to a location within said element; and generating a texture for each said element from a texture of at least one pixel in said set of in-element pixels.

It is another object of the present invention to disclose the method as described above, additionally comprising a step of generating said texture for each said element from the group consisting of a weighted average of said textures of said set of in-element pixels, an average of said textures of said set of in-element pixels, a texture of an in-element pixel with a highest score, a filtered texture of said set of in-element pixels, and any combination thereof.

It is another object of the present invention to disclose the method as described above, additionally comprising a step of, for each said foreground pixel, generating said score from a member of the group consisting of: a surface normal direction with respect to an optical axis of an imaging device, said imaging device having generated said 2D image; a correspondence between said point-cloud, and a position in said mesh; a depth border; said specularity; a semantic rule, and any combination thereof.

It is another object of the present invention to disclose the method as described above, additionally comprising a step of, for a sequence of images, modifying said score according to spatial continuity over time.

It is another object of the present invention to disclose the method as described above, additionally comprising a step of, for at least one element in a boundary region, merging data from neighboring imaging devices via a pyramid blending algorithm.

It is another object of the present invention to disclose the method as described above, additionally comprising a step of, for at least one of said invisible point, modifying said texture of said invisible point using a member of the group consisting of said score, an alpha mask, and any combination thereof.

It is another object of the present invention to disclose the method as described above, additionally comprising a step of combining at least two of said sub-surfaces into a group according to at least one semantic rule.

It is another object of the present invention to disclose the method as described above, additionally comprising a step of determining, for each foreground pixel in each of said plurality of said 2D images, a specularity value, said specularity value determined from a comparison of color and brightness of said foreground pixel in a plurality of said images.

It is another object of the present invention to disclose the method as described above, additionally comprising a step of determining a score map for each of said plurality of said 2D images, said score map having a score value for each foreground pixel in each of said plurality of said 2D images.

It is another object of the present invention to disclose the method as described above, additionally comprising a step of generating texture for each invisible point on said surface, said invisible point not being visible in any of said at least one 2D image at a given time, by means of a member of the group consisting of extending information from at least one foreground pixel on a visible portion of said surface on and near a boundary between said visible portion of said surface and said invisible portions of the surface; extrapolating information from at least one foreground pixel on a visible portion of said surface on and near a boundary between said visible portion of said surface and said invisible portions of the surface; copying texture from a model at a previous time, said point being visible at said previous time; copying texture from a model at a subsequent time, said point being visible at said subsequent time; applying a semantic rule, and any combination thereof.

It is another object of the present invention to disclose a program product for generating at least one textured three-dimensional (3D) model from a set of two-dimensional (2D) images, said program product comprising digital processor-executable program instructions stored on a non-transitory digital processor-readable medium that, when executed in a digital processing resource comprising least one digital processor, cause the digital processing resource to:

provide at least one 3D model, said 3D model comprising a set of sub-surfaces, said set of sub-surfaces defining a surface of the model;

determine, for each image in said set of 2D images, a set of foreground pixels, said set of foreground pixels corresponding to a visible part of said surface;

determine, in each image, for each foreground pixel in said set of foreground pixels, a score, and generating a set of scores;

for each element on said at least one 3D model, assign a texture to said element based on said set of scores.

It is another object of the present invention to disclose the program product as described above, wherein said instructions can be stored in a member of the group consisting of: a computer-readable medium, a database, a digital processor, the cloud, and any combination thereof.

It is another object of the present invention to disclose the program product as described above, wherein, for each image in said set of 2D images, said set of foreground pixels comprises a set of units, each unit comprising a visible portion of a sub-surface.

It is another object of the present invention to disclose the program product as described above, wherein said unit is selected from the group consisting of a face, a hand, an arm, a leg, a head, a torso, skin, clothing, a shirt, a skirt, a pair of pants, a pair of shorts, a pair of leggings, hair and any combination thereof.

It is another object of the present invention to disclose the program product as described above, wherein, for each imaging device, a pixel score is determined for each said foreground pixel in each of said images, said pixel score being determined, for each said foreground pixel i, from a member of a scoring group consisting of an angle $A_i$, a geometric quality $Q_i$, an edge $E_i$, a distance $D_i$, a specularity value $S_i$ a sub-surface group G and any combination thereof.

It is another object of the present invention to disclose the program product as described above, wherein, for each said foreground pixel in each said image, determining said angle $A_i$ as an angle between a normal to the surface and a camera optic axis of an imaging device generating said image, generating a set of angles $\{A_i\}$.

It is another object of the present invention to disclose the program product as described above, wherein, for each imaging device and each surface, said geometric quality measure $Q_i$ is determined by combining a measure of a closeness of the surface to a point-cloud with a density of the point-cloud and with a quality measure of the point-cloud, to generate a set of geometric quality measures $\{Q_i\}$.

It is another object of the present invention to disclose the program product as described above, wherein at least one edge between sub-surfaces is identified, to generate said set of edges $\{E_i\}$.

It is another object of the present invention to disclose the program product as described above, wherein, for each said foreground pixel, said distance $D_i$ is calculated between said foreground pixel and a nearest edge in the set of edges $\{E_i\}$, to generate a set of distances $\{D_i\}$.

It is another object of the present invention to disclose the program product as described above, wherein, for each said foreground pixel, said specularity value $\{S_i\}$ is calculated.

It is another object of the present invention to disclose the program product as described above, wherein said set of sub-surface groups $\{G_i\}$ is generated.

It is another object of the present invention to disclose the program product as described above, wherein, for each element in said model, an element score is generated, said element score determined from said pixel score for each of said foreground pixels with location corresponding to a location of said element.

It is another object of the present invention to disclose the program product as described above, wherein said set of 2D images is received, said set of 2D images comprising a member of the group consisting of a plurality of 2D images, a sequence of 2D images and any combination thereof. It is another object of the present invention to disclose the program product as described above, wherein said providing of said at least one 3D model is selected from the group consisting of: from a plurality of 2D images, from a single 2D image, from a downloaded 3D model, from a streamed 3D model and any combination thereof.

It is another object of the present invention to disclose the program product as described above, wherein at least one model sub-surface of said surface of said 3D model.

It is another object of the present invention to disclose the program product as described above, wherein at least one sub-surface edge for each of said at least one sub-surface is determined.

It is another object of the present invention to disclose the program product as described above, wherein for each sub-surface edge, a set of sub-surface edge pixels is generated.

It is another object of the present invention to disclose the program product as described above, wherein a score is determined for each said foreground pixel of said surface visible in each of said plurality of said 2D images.

It is another object of the present invention to disclose the program product as described above, wherein at least one image edge is determined for each of said at least one best image.

It is another object of the present invention to disclose the program product as described above, wherein, for each at least one surface edge, a set of image edge pixels is generated.

It is another object of the present invention to disclose the program product as described above, wherein a set of edge pixels is generated, said set of edge pixels comprising said set of image edge pixels and said set of sub-surface edge pixels.

It is another object of the present invention to disclose the program product as described above, wherein a geodesic distance is determined between each said foreground pixel in each of said plurality of said 2D images and each pixel in an edge pixel group consisting of said set of image edge pixels, said sub-surface edge pixels and any combination thereof.

It is another object of the present invention to disclose the program product as described above, wherein, for each said foreground pixel in each of said plurality of said 2D images, if said geodesic distance is greater than a predetermined value, a surface texture of a location on said surface of said 3D model to which said foreground pixel maps is set to a texture of a pixel with the highest score; and, if said geodesic distance is less than a predetermined value, a set of local pixels is determined, a local pixel being a member of said edge pixel group having said geodesic distance less than a predetermined value, said surface texture of said location on said surface of said 3D model to which said foreground pixel maps is set to a weighted average of textures of said set of local pixels.

It is another object of the present invention to disclose the program product as described above, wherein a set of in-element pixels is generated, each of said in-element pixels being a pixel with location mapping to a location within said element; and a texture is generated for each said element from a texture of at least one pixel in said set of in-element pixels.

It is another object of the present invention to disclose the program product as described above, wherein said texture is generated for each said element from the group consisting of a weighted average of said textures of said set of in-element pixels, an average of said textures of said set of in-element pixels, a texture of an in-element pixel with a highest score, a filtered texture of said set of in-element pixels, and any combination thereof.

It is another object of the present invention to disclose the program product as described above, wherein, for each said foreground pixel, said score is generated from a member of the group consisting of: a surface normal direction with respect to an optical axis of an imaging device, said imaging device having generated said 2D image; a correspondence between said point-cloud, and a position in said mesh; a depth border; said specularity; a semantic rule, and any combination thereof.

It is another object of the present invention to disclose the program product as described above, wherein, for a sequence of images, said score is modified according to spatial continuity over time.

It is another object of the present invention to disclose the program product as described above, wherein, for at least one element in a boundary region, data from neighboring imaging devices are merged via a pyramid blending algorithm.

It is another object of the present invention to disclose the program product as described above, wherein, for at least one of said invisible point, said texture of said invisible point is modified using a member of the group consisting of said score, an alpha mask, and any combination thereof.

It is another object of the present invention to disclose the program product as described above, wherein at least two of said sub-surfaces are combined into a group according to at least one semantic rule.

It is another object of the present invention to disclose the program product as described above, wherein, for each foreground pixel in each of said plurality of said 2D images, a specularity value is determined, said specularity value determined from a comparison of color and brightness of said foreground pixel in a plurality of said images.

It is another object of the present invention to disclose the program product as described above, wherein a score map for each of said plurality of said 2D images is determined, said score map having a score value for each foreground pixel in each of said plurality of said 2D images.

It is another object of the present invention to disclose the program product as described above, wherein texture is generated for each invisible point on said surface, said invisible point not being visible in any of said at least one 2D image at a given time, by means of a member of the group consisting of extending information from at least one foreground pixel on a visible portion of said surface on and near a boundary between said visible portion of said surface and said invisible portions of the surface; extrapolating information from at least one foreground pixel on a visible portion of said surface on and near a boundary between said visible portion of said surface and said invisible portions of the surface; copying texture from a model at a previous time, said point being visible at said previous time; copying texture from a model at a subsequent time, said point being visible at said subsequent time; applying a semantic rule, and any combination thereof.

BRIEF DESCRIPTION OF THE FIGURES

In order to better understand the invention and its implementation in practice, a plurality of embodiments will now be described, by way of non-limiting example only, with reference to the accompanying drawings, wherein.

DETAILED DESCRIPTION OF THE PREFERRED EMBODIMENTS

Figure 1:
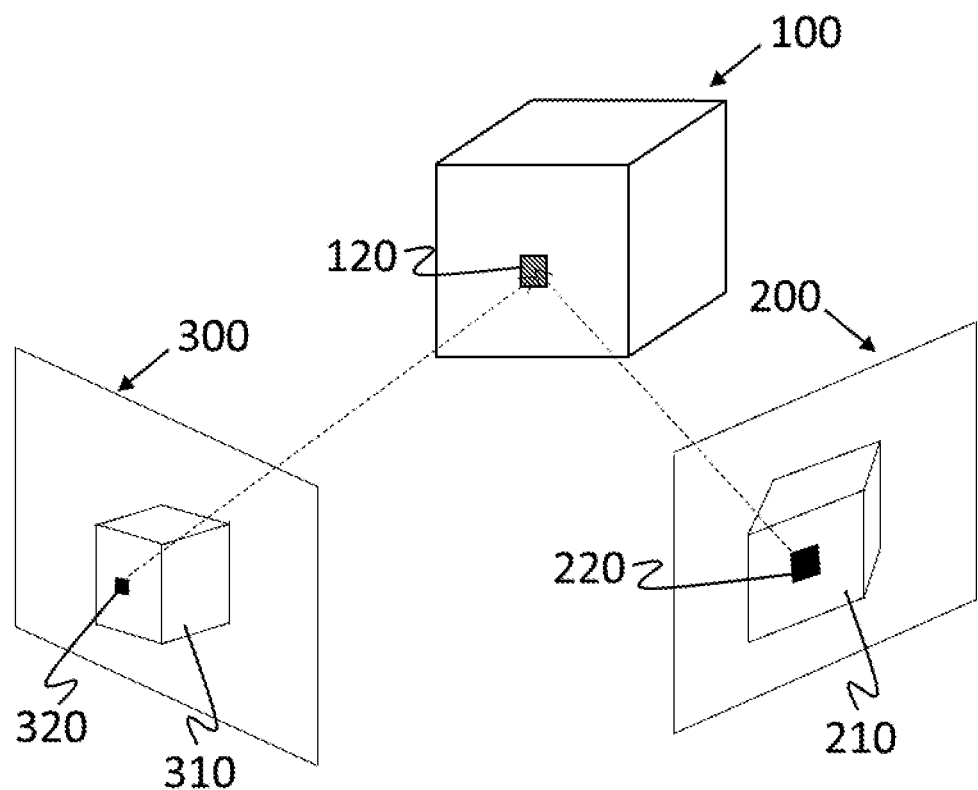
FIG. 1 illustrates a relationship between pixels in images and elements in a model.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for texturing a surface using 2D images sourced from a plurality of imaging devices.

The term 'object' hereinafter refers to an individual item as visible in an original image.

The term 'image' hereinafter refers to a single picture as captured by an imaging device. A view of a couple dancing, as captured from a position on a dais, constitutes a non-limiting example of an image. A view of a face, showing only the face on a black background, constitutes a non-limiting example of an image.

The term 'sequence of images' hereinafter refers to more than one image from the same imaging device, where there is a relationship between each image and the next image in the sequence. A sequence of images typically forms at least part of a video or film.

The term 'model' hereinafter refers to a representation of an object as generated by software at a given point in time. For non-limiting, example, as used herein, a person constitutes an object. The person, as captured in a video image, also constitutes an object. The person, as input into software and, therefore, manipulatable, constitutes a model.

The term 'sequence of models' hereinafter refers to more than one model, where there is a relationship between each model and the next model in the sequence. Typically, the time interval between one model in the sequence and the next model in the sequence is the same for all such pairs of models in the sequence.

The term 'plurality of images' hereinafter refers to more than one image taken at the same time, where each image is captured by a different imaging device. For non-limiting example, a person stands in a studio and four images are captured, (1) a frontal image, (2) an image from the rear, (3) a right side image, and (4) a left side image. The four images are a plurality of images. If four video cameras were run, one aimed at the person's front, one at the left side, one at the person's rear and one at the right side, the four video sequences would be a plurality of image sequences.

The term 'surface' hereinafter refers to the totality of the outermost part of a model. For non-limiting example, a person's skin defines the surface of the person.

The term 'sub-surface' hereinafter refers to a portion of the surface where either the surface normals do not differ significantly across the surface or the portion of the surface is recognizable as a single component. For non-limiting example, the front of the chest of a person and the back of the person comprise different sub-surfaces. In another non-limiting example, the legs, arms and head of the person are sub-surfaces. The person's torso can be defined as one sub-surface or as a set of four sub-surfaces (front, back, left side, right side).

The term 'unit' hereinafter refers to a portion of a sub-surface where, for a given image, no part of the sub-surface is occluded or invisible. In other words, a unit is that part of a sub-surface which is visible in a given image. The size and shape of a unit can differ between images, both for images at a given time from different imaging devices and for images from the same imaging device at different times.

The term virtual reality image' or 'VR image' hereinafter refers to one or more 3D models rendered to be viewed in a virtual reality environment, for non-limiting example, via a VR headset.

The term 'foreground object' hereinafter refers to an object of interest in an image. For non-limiting example, an image comprises a person, a table, 3 chairs, and two pictures on a wall. The person is the foreground object.

The term 'background object' hereinafter refers to an object not of interest in an image. For non-limiting example, an image comprises a person, a table, 3 chairs, and two pictures on a wall. The table, chairs, pictures ant the wall are background objects.

The term 'foreground mask boundary' hereinafter refers to a boundary between a foreground object and the background object(s)).

The term 'element' hereinafter refers to an area of the geometrical surface of a model. For a model surface described by a mesh, the mesh divides the surface into a set of non-overlapping but contiguous areas. Each of the non-overlapping but contiguous areas constitutes an element of the mesh.

The term 'foreground pixel' hereinafter refers to a pixel that forms part of a foreground object. Typically, a foreground pixel will map onto an element. One method of generating 3D models is to place an object (one or more items to be imaged) in a location with a plurality of 2D imaging devices, with the imaging devices viewing the subject from a plurality of angles. In preferred embodiments, the subject can move during generation of the 2D images. In some embodiments, the subject is stationary during generation of the 2D images. In embodiments where the subject can, move, typically, each 2D imaging device will generate a sequence of images, a 2D video. From the 2D images, one or more 3D models can be generated.

The present invention discloses a method of generating texture for a model, where the images used for generating the model were captured by a plurality of imaging devices. Typically, the images for generation of the model are captured in a volumetric capturing studio with a plurality of imaging devices, typically, but not limited to RGB cameras, where the number of cameras can vary from two to more than 100.

FIG. 1 schematically illustrates a model (110) of an object and two images (200, 300) in which the foregrounds (210, 310) comprise 2D representation of the object from different angles. For simplicity and clarity, a single element (120) of the model (110) is shown. In each of the image foregrounds (210, 310) a single pixel (220, 320) is shown. The pixels (220, 320) have locations that map onto (dashed arrows) the element. As discussed below, the element (120) can be a different size from the pixels (220, 320) and the pixels (220, 320) can map onto different parts of the element (120), as shown by the dashed arrows ending in different parts of the element (120).

If a sequence of 3D models is generated, two kinds of continuity are needed, spatial continuity and temporal continuity. Spatial continuity refers to continuity of texture across the surface of a model at a given time, while temporal continuity refers to continuity of texture between models at different times.

For spatial continuity, in general, some portions of the surface of the object will be viewed by one or more imaging devices, while other portions of the surface will not be viewed by any imaging device. When the model is textured, it is desirable for the texture to be consistent over space and to cover the entire model so that, for example, if the model is used to generate a sequence of virtual reality images showing a person dancing, while the original object was the person standing with his arms at his sides, the dancing person's shirt would look realistic—the pattern of the shirt on the sides of the body, which were not seen by any camera, would be continuous with and consistent with the pattern on the front and back of the shirt—and there would be no unexpected changes in color or brightness of the shirt due to artefacts of lighting in the studio, so that an image captured by one camera was brighter than an image captured by another camera.

For temporal continuity, in general, some portions of the surface will be of the object will be viewed by one or more imaging devices at one time, while the same portions of the surface may not be viewed by any imaging device at a different time. When the model is textured, it is desirable for the texture to be consistent over time so that an item that appears on the surface at one time remains on the surface at another time. For non-limiting example, a plurality of sequences is generated of a person in a rugby shirt which has a logo on the left side of the chest. The imaging devices are at approximately chest level. At one time, the person's arms are in front of his upper chest so that the logo is invisible in all of the plurality of images while, at at least one other time, at least one arm is in a different position so that the logo is visible in at least one of the plurality of images taken at that time. If the sequence of models is used to generate a sequence of virtual reality images showing the person as he would appear if the viewer were looking downward, such as from a seat in an upper tier at a stadium, the logo should be visible at the time when the person's arms were across the chest. If only spatial continuity is used, then the logo position is blank, being the color and pattern of the shirt. If temporal continuity is used, then the image of the logo will appear, the shape, size and coloring of the logo being taken from texture generated at a different time and the location of the logo being generated by tracking the movement of the chest from its location and orientation at the time the logo was visible in the plurality of images, to its location and orientation at the time the logo was invisible in the plurality of images.

Another important issue with time continuity is avoidance of flicker. There are typically small differences between imaging devices, even if the imaging devices are nominally identical. There can also be differences between the lighting conditions as viewed by different imaging devices.

For non-limiting example, a person may be facing the brightest light. The face will appear brighter for an imaging device below the light (imaging device A) than for an imaging device at 60° to the left of the light (imaging device B). If the model is to face 30° to the left of the light, a system may alternate between selecting imaging device A to generate texture for the face and imaging device B to generate texture for the face. Since the brightness of the face differs between imaging device A and imaging device B, flicker will be observed.

In preferred embodiments, at least one sequences of images is generated, with one sequence of images being generated for each imaging device used. The sequence(s) of images are used to generate texture for the model(s) and can be used to generate geometry for the model(s).

For the model geometry, a point cloud can be provided or a model geometry can be provided by any conventional means of providing a geometry of the model.

All methods of providing a model geometry have imperfections, therefore a surface quality measure is used. If the model geometry is associated with a point cloud, the surface quality measure can be based on the point cloud density; the point cloud accuracy, typically the difference between the location of a point in the cloud and the nearest geometric location; the number of outliers, the outlier density, and any combination thereof.

The point cloud can be generated independently and provided to the system, or it can be generated from a plurality of images from one or more of the sequences of images. If the surface of the model is generated from the point cloud, the points in the point cloud are used to get a measure of the accuracy of surface, which can be derived from means such as, but not limited to, the quality of the point cloud itself, agreement from several devices on the location of the surface and any combination thereof.

In preferred embodiments, for each model, the surface of the model is defined, for non-limiting example, by a mesh or voxels. Any conventional means of defining the geometry of the surface can be used. For simplicity hereinbelow, the surface will be described as being defined by a mesh, although the method can work with any conventional method of defining a surface. The mesh divides the surface into a set of non-overlapping but contiguous areas; each of these non-overlapping but contiguous areas is an element of the mesh.

The relationship between foreground pixels in an image and elements in the mesh depends on the foreground pixel size, the element size, and the surface normal direction with respect to the imaging device optical axis. There is no fixed relationship between foreground pixel and element, or between foreground pixel size and element size. Typically (although not always), all pixels of a given imaging device are the same size. Typically (although not always), some elements in a mesh will be larger than other elements in the mesh. Foreground pixels are mapped to elements so that the foreground pixel(s) and the element(s) they map to cover the same fraction of a surface.

A foreground pixel can be larger than an element, it can be the same size as an element, or it can be smaller than an element. A foreground pixel can map onto a single element, it can map onto at least a portion of a plurality of elements, or at least a portion of a plurality of elements can map onto a foreground pixel.

For at least one image, there can be one or more elements onto which no pixels map. For non-limiting examples, a portion of the object is occluded in the image, a portion of the object is invisible in the image, or no image shows that portion of the object at at least one time point. In particular, there can be elements onto which no pixels map for any imaging device.

In the method of the present invention, for each image, a score map is created, with a score for each foreground pixel, each foreground pixel mapping onto at least a portion of an element. Some pixels are not mapped to an element since they image a part of the background, so the score is only for foreground pixels, which have a mapping to an element.

The score is determined by:
1. The surface normal direction with respect to the imaging device optical axis. In a spherical coordinate system this will be comprised of two angles, a polar angle $\theta$, which measures the horizontal projection of the angle, and an azimuthal angle $\phi$, which measures the vertical projection of the angle.
2. The correspondence between the point-cloud, the set of positions in space determined from the foreground pixels in an image, and the positions in the model mesh of the part of the model corresponding to what is visible in the image. This correspondence between point-cloud and mesh represents the "quality of the surface"; the poorer the correspondence, the lower the confidence in the accuracy of the surface. In general a poor correspondence also means that the surface is poorly defined from the image.
3. The depth borders. Foreground pixels closer to a foreground mask boundary (a boundary between an object of interest, a foreground object, and all objects not of interest, background object(s)) and foreground pixels on a portion of the object that have a large angle to the perpendicular to the imaging device (optic axis of the imaging device) receive a lower weight.
4. Foreground pixels that are deemed specular receive a significantly lower weight.
5. Semantic rules that can change the balance between continuity considerations, spatial considerations and quality considerations, where the rule change depends on the type of surface (the semantics). For non-limiting example, for the face, more emphasis is given to temporal continuity whereas, for the chest, more emphasis is given to spatial continuity.
6. In addition, when there are sequences of images, the score is modified to provide, insofar as is possible, both spatial continuity and temporal continuity; spatial continuity requirements being considered separately from temporal continuity requirements. For temporal continuity, insofar as is possible, the same imaging device is selected over time. This reduces the probability of artefacts due to different imaging device angles and different illumination from different directions. For spatial continuity, insofar as is possible, each imaging device that is chosen is the one that provides, for some part of the model, an area of the surface that is the largest that is practicable.

For each imaging device, at each time point, typically, parts of the 3D surface of the model will be visible and other parts will be hidden, not visible. If a part is visible at a given time point for a given imaging device, that part has a score for that imaging device. Those imaging devices for which the part is not visible at that time point have no score (or a score of a predetermined value which clearly indicates that the part is invisible for that imaging device and that time point).

For each time point, each imaging device and each element on each unit of each sub-surface, the score determines which camera(s) to choose and a texture atlas image is built using the score. For each element in the model, the texture can be generated, as described below, from the textures of a plurality of imaging devices. The weight given to the texture for a given foreground pixel, during generation of the texture, will depend on the score for that foreground pixel for each imaging device, as described above, and on the scores for foreground pixels in both the spatial and temporal neighborhood of that foreground pixel. In boundary regions (areas near a boundary where there is a change from use of one imaging device, a first neighboring imaging device, to use of another imaging device, a second neighboring imaging device), the score is used to merge data from the neighboring imaging devices using a pyramid blending algorithm, typically in the UV-texture domain, although pyramid blending can be used in other texture domains. The score is used to derive an alpha mask (transparency mask) in the blending process for a smooth composition in discontinuity regions. Typically, if, in a portion of the boundary regions, the alpha value for one imaging device is increasing, the alpha value for the other imaging device will be decreasing; at one edge of a boundary region, alpha will be 1 (or nearly one) for a first imaging device and zero (or nearly zero) for a second imaging device, while at the other edge of the boundary region, alpha will be zero (or nearly zero) for the first imaging device and 1 (or nearly one) for the second imaging device. It is clear that, if a foreground pixel has a low score for one imaging device and a corresponding pixel has a higher score for another imaging device, the alpha value will be lowered for the first imaging device and raised for the second imaging device; the image from the second device will affect the final image more than would otherwise be expected.

The procedure above for determining texture near a boundary can easily be extended for boundaries where more than two imaging devices cover the same area. In such regions, there will be one alpha mask for each imaging device, with the alpha values for each image being correlated so that a smooth composition is generated across the boundary region.

For a given time point in a sequence of images, if there is an invisible portion of the model surface, a portion of the surface which does not appear in any of the plurality of images for that time point, the invisible portion can be textured using one or more of the following techniques, or a combination thereof:
1. Information from foreground pixels on and near the boundary between the visible and invisible portions of the surface can be extended or extrapolated from the visible portion of the surface into the invisible portion. Scoring and alpha masking, as described above, can be used to combine smoothly information from the different sides of the boundary.

2. Time continuity can be used. If a portion of the surface is invisible in all images at a time point $t_1$ but was visible in at least one image at at least one other time point $t_2$, the portion of the surface was textured at time point $t_2$. Therefore, as the texture is not expected to change significantly over time, the texture of the portion of the surface at time point $t_2$ can be applied to the portion of the surface time point $t_1$, 3. Semantics can be used—rules can determine the balance between, for non-limiting example, spatial considerations, temporal considerations, and normal angle considerations. Other considerations are disclosed herein. Rules can specify one or more types of texture to be used on a one or more types of surface, and, from rules determined by deep learning methods, rules can be used to fill in texture where it is occluded or invisible in a plurality of images, a sequence of images and any combination thereof.

In some embodiments, an area that comprises at least part of the face, a hand and any combination thereof, more emphasis will be placed on temporal continuity and avoidance of specularity, whereas, for an area comprising at least a portion of clothing, more emphasis will be placed on spatial continuity.

Figure 2A:
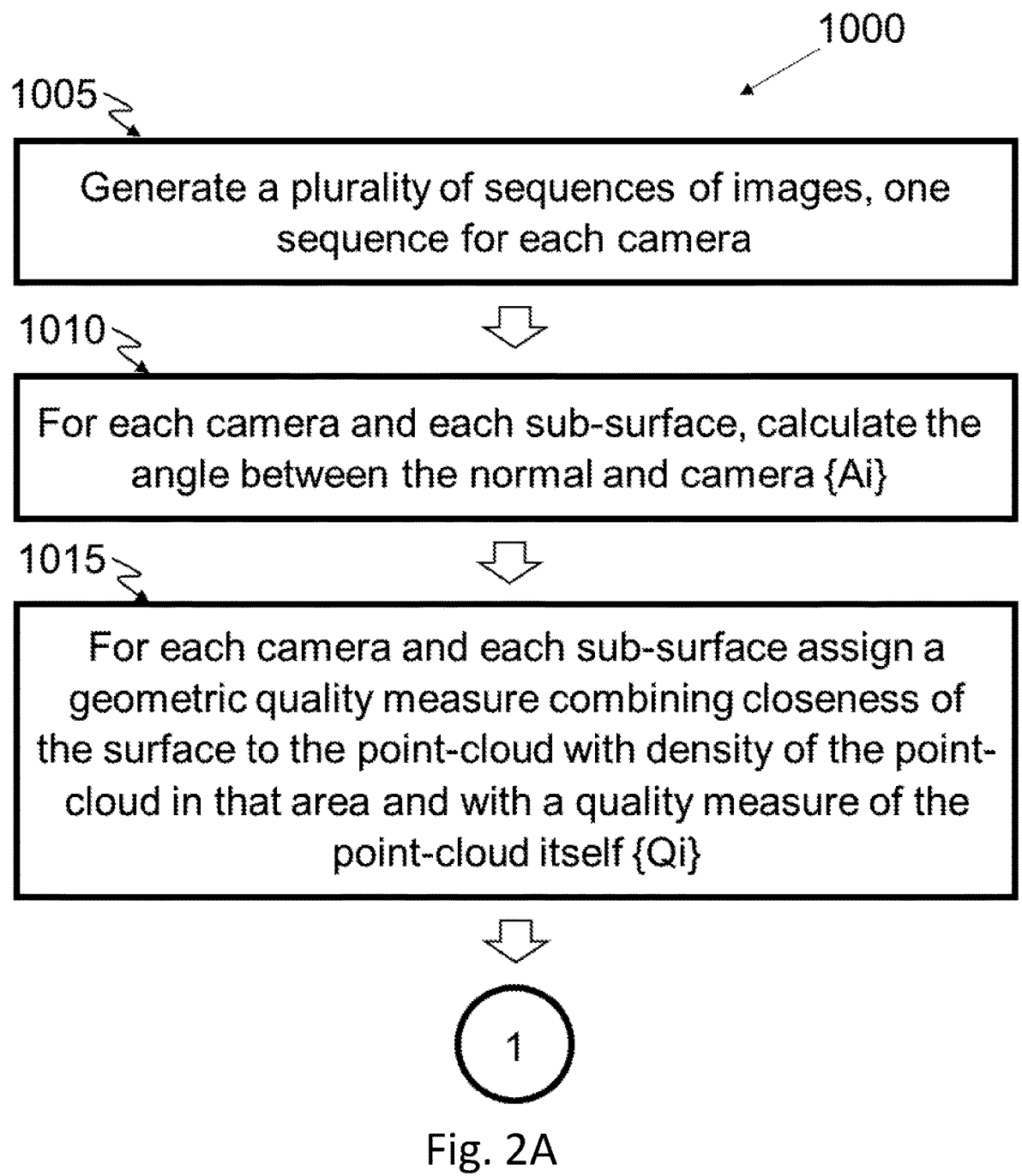
FIG. 2A-D illustrates a flow chart (1000) of an embodiment of the method.
Figure 2B:
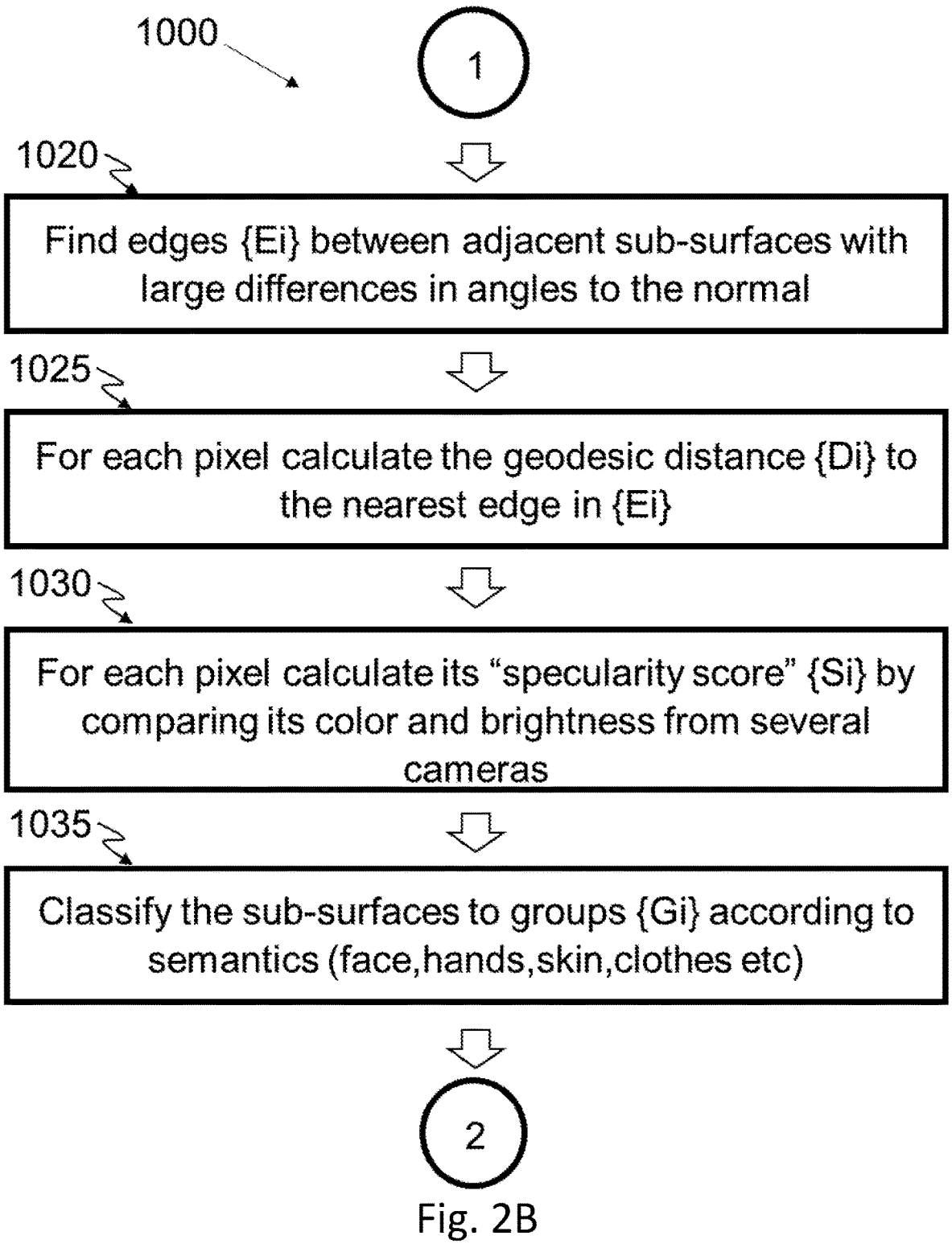
Figure 2C:
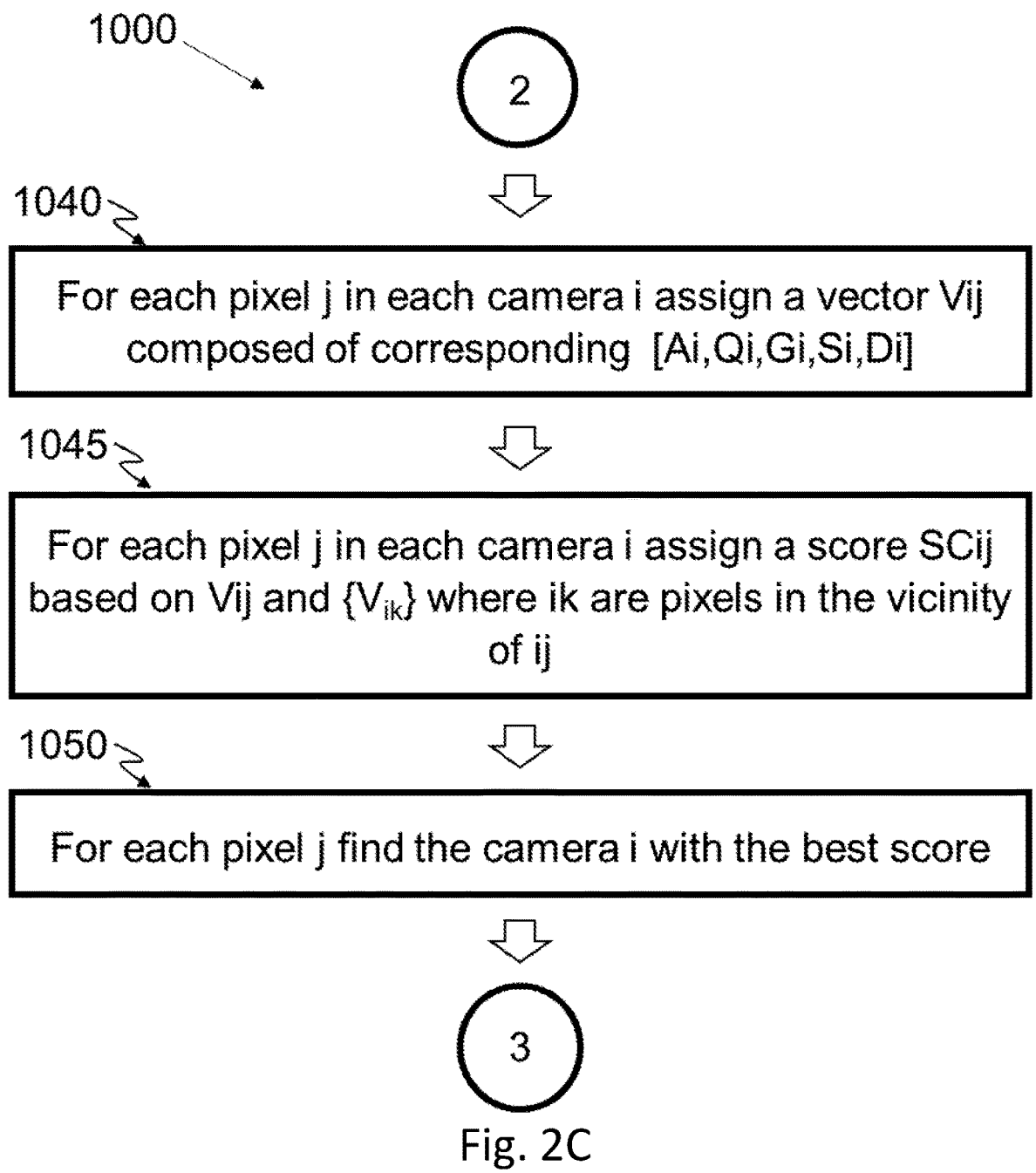
Figure 2D:
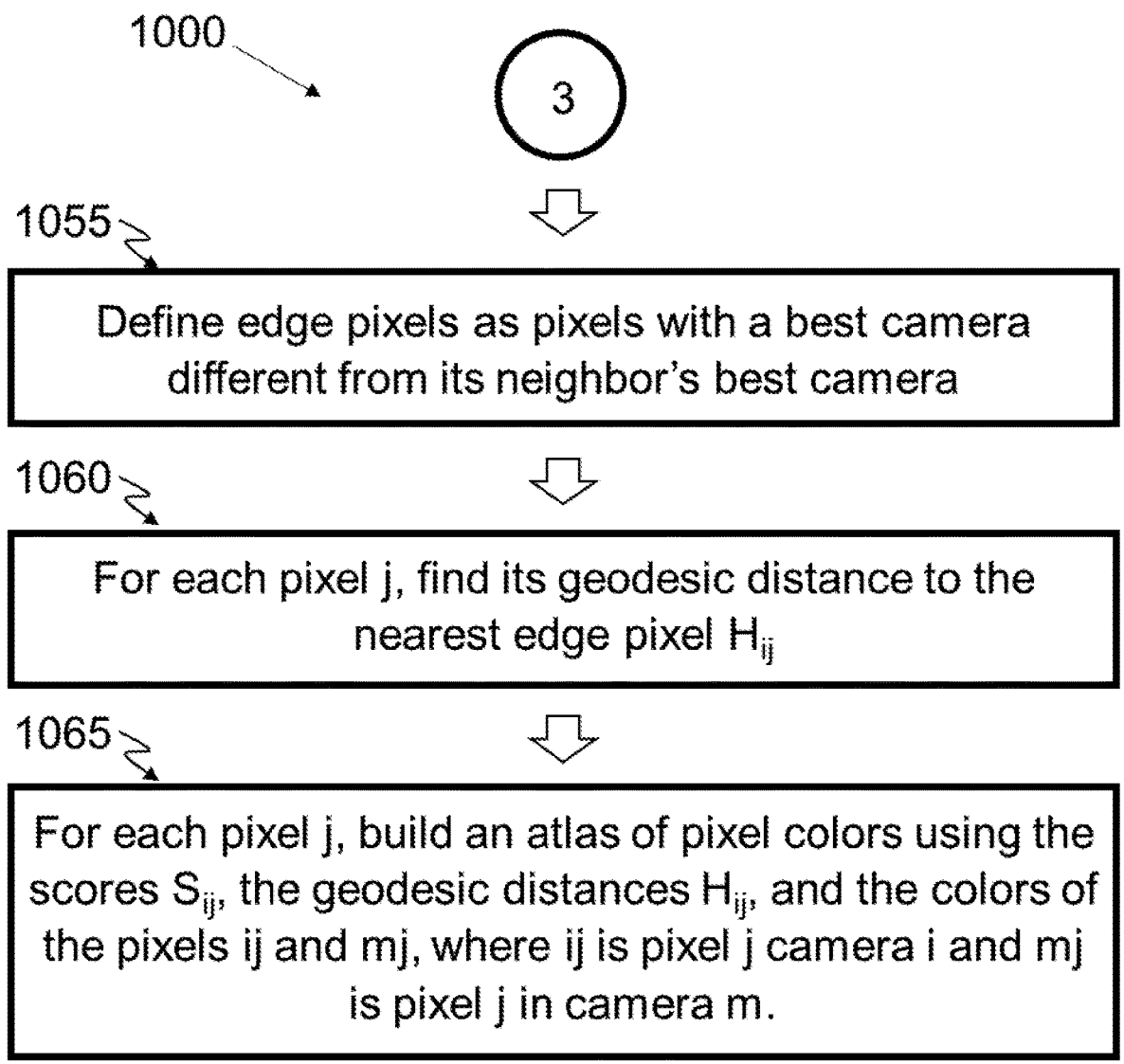

FIG. 2A-D illustrates a flow chart (1000) of an embodiment of the method. FIG. 2A shows the first 4 steps of the method, FIG. 2B shows the subsequent 4 steps, FIG. 2C shows the 3 steps subsequent to that, and FIG. 2D shows the last 3 steps.

As shown in FIG. 2A, once the sequence of images has been generated (1005), for each imaging device and each portion of the surface, calculate (1010) the angle between the normal to the surface and the camera optic axis, generating a set of angles $\{A_i\}$.

For each imaging device and each surface assign (1015) a geometric quality measure Q' from the closeness of the surface, as defined by its mesh, to the point-cloud combined with the density of the point-cloud in that area and with a quality measure of the point-cloud itself, generating a set of geometric quality measures $\{Q_i\}$.

As shown in FIG. 2B, edges (1020) are found between units, generating a set of edges $\{E_i\}$.

For each foreground pixel, a geodesic distance $D_i$ is calculated (1025) between the foreground pixel and the nearest edge in the set of edges $\{E_i\}$ is calculated, generating a set of distances $\{D_i\}$.

For each foreground pixel, a specularity value $\{Si\}$ is calculated (1030) by comparing the color and brightness of the pixel as determined from several imaging devices, generating a set of specularity values $\{Si\}$. A foreground pixel where the color and brightness change significantly between corresponding foreground pixels in images from different imaging devices is more specular than one where the color and brightness remain substantially the same for corresponding foreground pixels across all images.

The sub-surfaces can be combined (1035) into groups G according to semantic rules, such as, but not limited to, the face, a hand, an arm, a leg, a head, a torso, skin, clothing, a shirt, a skirt, a pair of pants, a pair of shorts, a pair of leggings, and hair, thus generating a set of sub-surface groups $\{Gi\}$.

As shown in FIG. 2C, for each foreground pixel j in each imaging device i, carry out the following steps:

A. Assign (1040) a vector $V_{ij}$, where $V_{ij}=[A_{ij}, Q_{ij}, G_{ij}, S_{ij}, D_{ij}]$ and $A_{ij}$ is the angle for the foreground pixel j in imaging device i, Q' is the quality for the foreground pixel, $G_{ij}$ is the group, $S_{ij}$ is the specularity and $D_{ij}$ is the distance to the edge.

B. Assign (1045) a score $SC_{ij}$ based on $V_{ij}$ and $\{V_{ik}\}$ where ik are foreground pixels of imaging device i in the vicinity of foreground pixel j.

Then, with the set of scores $\{SC_{ij}\}$, for each foreground pixel j, find (1050) the imaging device i with the best score.

In general, the object of the scoring is to minimize, for each model, the number of imaging devices used to generate the images that went into the model texture and also, for a sequence of models, to minimize both the number of imaging devices used to generate the images that went into each model and also to minimize the number of times the imaging device providing the image for texture of a region of the models changes. The score is also configured to maximize the quality of the model texture by minimizing the likelihood of artefacts in the model texture, where the artefacts can result from specular reflection, highly off-axis surfaces boundaries where the normal to the surface changes rapidly or changes significantly (for non-limiting example, the boundary where faces of a cube meet). In addition, the score can take into account that a less-good image of a sub-region can provide a more natural-looking model texture for the region of which it is part, if the sub-region and the region form a unitary part. For non-limiting example, in general it is better to use the same imaging device for the whole of a face, rather than using one camera for the forehead, eyes and mouth, two others for the nose and yet others for the parts of the cheeks close to the ears.

As shown in FIG. 2D, find (1055) a set of edge pixels $\{E_{iq}\}$, where $E_{iq}$ is the qth edge pixel in camera i. Edge pixels are defined as foreground pixels with a best imaging device different from a neighboring foreground pixel's best imaging device.

For each foreground pixel j, carry out the following steps:

A. Find (1060) the geodesic distance $H_{ij}$ between foreground pixel j and the nearest edge pixel q.

B. Build (1065) an atlas of pixel colors using the scores $S_{ij}$, the geodesic distances $H_{ij}$, and the colors of the foreground pixels ij and mj, where foreground pixel ij is the jth foreground pixel of camera i and mj is the jth foreground pixel of camera m. The rule for determining the color of pixels is: If $H_{ij}$ is large, the pixel color is that of the camera with the highest score $S_{ij}$. Otherwise the pixel color is a weighted average of the scores for the foreground pixels of imaging devices i and m, with the weight calculated from the scores $S_{ij}$ and $S_{mj}$. The element colors are generated from the atlas of pixel colors, where the color of an element (the texture of the element) is generated from the colors of those pixels in the atlas of pixel colors that have locations within the boundaries of the element ("in-element pixels").

Any conventional means of combining pixel colors of in-element pixels can be used.

For non-limiting example, in some embodiments, the in-element pixels are filtered. For non-limiting examples, outliers can be removed, overly-dark pixels can be removed, and overly-light pixels can be removed.

The texture of the element can be generated from, for non-limiting example a weighted average of the in-element pixel colors, an average of the in-element pixel colors, a texture of the in-element pixel with the highest score, an average (either weighted or unweighted) of the filtered in-element pixel colors, and any combination thereof.

The invention claimed is:

1. A method for a generating at least one textured three-dimensional (3D) model from a set of two-dimensional (2D) images, comprising steps of:
providing at least one 3D model, said 3D model comprising a set of sub-surfaces, said set of sub-surfaces defining a surface of the model;
determining, for each image in said set of 2D images, a set of foreground pixels, said set of foreground pixels corresponding to a visible part of said surface;
for each said foreground pixel in each said image, determining angle $A_i$ as an angle between a normal to the surface at said foreground pixel and a camera optic axis of an imaging device generating said image;
determining a geodesic distance between each said foreground pixel in each of said plurality of said 2D images and each pixel in an edge pixel group consisting of said set of image edge pixels, said sub-surface edge pixels and any combination thereof;
for each said foreground pixel in each of said plurality of said 2D images, if said geodesic distance is greater than a predetermined value, setting a surface texture of a location on said surface to which said foreground pixel maps to be a texture of a pixel with the highest score; and, if said geodesic distance is less than a predetermined value, determining a set of local pixels, a local pixel being a member of said edge pixel group having said geodesic distance less than a predetermined value, and setting said surface texture of a location on said surface to which said foreground pixel maps to a weighted average of textures of said set of local pixels;
determining, in each image, for each foreground pixel in said set of foreground pixels, a score, said score based at least partially on said angle Ai, and generating a set of scores;
for each element on said at least one 3D model, assigning a texture to said element based on said set of scores;
wherein said angle $A_i$ is the only angle comprised in said score.

2. The method according to claim 1, additionally comprising steps of, for each image in said set of 2D images, comprising said set of foreground pixels of a set of units, each unit in said set of units comprising a visible portion of a sub-surface; and selecting said unit comprising a member of the group consisting of: a face, a hand, an arm, a leg, a head, a torso, skin, clothing, a shirt, a skirt, a pair of pants, a pair of shorts, a pair of leggings, hair and any combination thereof.

3. The method according to claim 1, additionally comprising a step of, for each imaging device, determining a pixel score for each said foreground pixel in each of said images, said pixel score determined, for each said foreground pixel i, from a member of a scoring group consisting of said angle $A_i$, a geometric quality $Q_i$, an edge $E_i$, a distance $D_i$, a specularity value $S_i$, a sub-surface group G and any combination thereof, additionally comprising one or more of the following steps:
 a. generating a set of angles $\{A_i\}$;
 b. for each imaging device and each surface, determining said geometric quality measure $Q_i$ by combining a measure of a closeness of the surface to a point-cloud with a density of the point-cloud and with a quality measure of the point-cloud, generating a set of geometric quality measures $\{Q_i\}$;
 c. identifying at least one edge between sub-surfaces, generating said set of edges $\{E_i\}$;
 d. for each said foreground pixel, calculating said distance $D_i$ between said foreground pixel and a nearest edge in the set of edges $\{E_i\}$, generating a set of distances $\{D_i\}$;
 e. for each said foreground pixel, calculating said specularity value $\{S_i\}$;
 f generating said set of sub-surface groups $\{G_i\}$; or
 g. generating, for each element in said model, an element score, said element score determined from said pixel score for each of said foreground pixels with location corresponding to a location of said element.

4. The method according to claim 1, additionally comprising a step of receiving said set of 2D images, said set of 2D images comprising a member of the group consisting of a plurality of 2D images, a sequence of 2D images and any combination thereof.

5. Method according to claim 4, additionally comprising one or more of the following steps:
 a. selecting said providing of said at least one 3D model from the group consisting of: from a plurality of 2D images, from a single 2D image, from a downloaded 3D model, from a streamed 3D model and any combination thereof;
 b. determining at least one model sub-surface of said surface of said 3D model;
 c. determining at least one sub-surface edge for each of said at least one sub-surface;
 d. for each sub-surface edge, generating a set of sub-surface edge pixels;
 e. determining a score for each said foreground pixel of said surface visible in each of said plurality of said 2D images;
 f determining at least one image edge, for each of said at least one best image;
 g. for each at least one surface edge, generating a set of image edge pixels;
 h. generating a set of edge pixels, said set of edge pixels comprising said set of image edge pixels and said set of sub-surface edge pixels;
 i. for each said foreground pixel, generating said score from a member of the group consisting of: a surface normal direction with respect to an optical axis of an imaging device, said imaging device having generated said 2D image; a correspondence between said point-cloud, and a position in said mesh; a depth border; said specularity; a semantic rule, and any combination thereof;
 j. for a sequence of images, modifying said score according to spatial continuity over time;
 k. for at least one element in a boundary region, merging data from neighboring imaging devices via a pyramid blending algorithm; or
 m. for at least one of said invisible point, modifying said texture of said invisible point using a member of the group consisting of said score, an alpha mask, and any combination thereof.

6. The method according to claim 1, additionally comprising steps of generating a set of in-element pixels, each of said in-element pixels being a pixel with location mapping to a location within said element; generating a texture for each said element from a texture of at least one pixel in said set of in-element pixels; and selecting said generating of said texture for each said element from the group consisting of a weighted average of said textures of said set of in-element pixels, an average of said textures of said set of in-element pixels, a texture of an in-element pixel with a highest score, a filtered texture of said set of in-element pixels, and any combination thereof.

7. The method of claim 1, additionally comprising one or more of the following steps:
   a. combining at least two of said sub-surfaces into a group according to at least one semantic rule;
   b. determining, for each foreground pixel in each of said plurality of said 2D images, a specularity value, said specularity value determined from a comparison of color and brightness of said foreground pixel in a plurality of said images;
   c. The method of claim 1, additionally comprising a step of determining a score map for each of said plurality of said 2D images, said score map having a score value for each foreground pixel in each of said plurality of said 2D images; or
   d. generating texture for each invisible point on said surface, said invisible point not being visible in any of said at least one 2D image at a given time, by means of a member of a group consisting of extending information from at least one foreground pixel on a visible portion of said surface on and near a boundary between said visible portion of said surface and said invisible portions of the surface; extrapolating information from at least one foreground pixel on a visible portion of said surface on and near a boundary between said visible portion of said surface and said invisible portions of the surface; copying texture from a model at a previous time, said point being visible at said previous time; copying texture from a model at a subsequent time, said point being visible at said subsequent time; applying a semantic rule, and any combination thereof.

8. A program product for generating at least one textured three-dimensional (3D) model from a set of two-dimensional (2D) images, said program product comprising digital processor-executable program instructions stored on a non-transitory digital processor-readable medium that, when executed in a digital processing resource comprising least one digital processor, cause the digital processing resource to:
   provide at least one 3D model, said 3D model comprising a set of sub-surfaces, said set of sub-surfaces defining a surface of the model;
   determine, for each image in said set of 2D images, a set of foreground pixels, said set of foreground pixels corresponding to a visible part of said surface;
   determine a geodesic distance between each said foreground pixel in each of said plurality of said 2D images and each pixel in an edge pixel group consisting of said set of image edge pixels, said sub-surface edge pixels and any combination thereof;
   for each said foreground pixel in each of said plurality of said 2D images, if said geodesic distance is greater than a predetermined value, a surface texture of a location on said surface of said 3D model to which said foreground pixel maps is set to a texture of a pixel with the highest score; and, if said geodesic distance is less than a predetermined value, a set of local pixels is determined, a local pixel being a member of said edge pixel group having said geodesic distance less than a predetermined value, said surface texture of said location on said surface of said 3D model to which said foreground pixel maps is set to a weighted average of textures of said set of local pixels;
   for each said foreground pixel in each said image, determine angle Ai as an angle between a normal to the surface at said foreground pixel and a camera optic axis of an imaging device generating said image;
   determine, in each image, for each foreground pixel in said set of foreground pixels, a score, said score based at least partially on said angle Ai, and generating a set of scores;
   for each element on said at least one 3D model, assign a texture to said element based on said set of scores;
   wherein said angle $A_i$ is the only angle comprised in said score.

9. The program product of claim 8, wherein said non-transitory digital processor-readable medium comprises a member of the group consisting of: a computer-readable medium, a database, a digital processor, the cloud, and any combination thereof.

10. The program product of claim 8, wherein, for each image in said set of 2D images, said set of foreground pixels comprises a set of units, each unit in said set of units comprising a visible portion of a sub-surface; said unit comprising a member selected from the group consisting of a face, a hand, an arm, a leg, a head, a torso, skin, clothing, a shirt, a skirt, a pair of pants, a pair of shorts, a pair of leggings, hair and any combination thereof.

11. The program product of claim 8, wherein, for each imaging device, a pixel score is determined for each said foreground pixel in each of said images, said pixel score being determined, for each said foreground pixel i, from a member of a scoring group consisting of said angle $A_i$, a geometric quality $Q_i$, an edge $E_i$, a distance $D_i$, a specularity value $S_i$, a sub-surface group $G_i$ and any combination thereof; at least one of the following being true:
   a. generating a set of angles $\{A_i\}$;
   b. for each imaging device and each surface, said geometric quality measure $Q_i$ is determined by combining a measure of a closeness of the surface to a point-cloud with a density of the point-cloud and with a quality measure of the point-cloud, to generate a set of geometric quality measures $\{Q_i\}$;
   c. at least one edge between sub-surfaces is identified, to generate said set of edges $\{E_i\}$;
   d. for each said foreground pixel, said distance $D_i$ is calculated between said foreground pixel and a nearest edge in the set of edges $\{E_i\}$, to generate a set of distances $\{D_i\}$;
   e. for each said foreground pixel, said specularity value $\{S_i\}$ is calculated;
   f. said set of sub-surface groups $\{G_i\}$ is generated; or
   g. for each element in said model, an element score is generated, said element score determined from said pixel score for each of said foreground pixels with location corresponding to a location of said element.

12. The program product of claim 8, wherein said set of 2D images is received, said set of 2D images comprising a member of the group consisting of a plurality of 2D images, a sequence of 2D images and any combination thereof.

13. The program product of claim 12, wherein at least one of the following is true:
   a. said providing of said at least one 3D model is selected from the group consisting of: from a plurality of 2D images, from a single 2D image, from a downloaded 3D model, from a streamed 3D model and any combination thereof;
   b. at least one model sub-surface of said surface of said 3D model;
   c. at least one sub-surface edge for each of said at least one sub-surface is determined;
   d. for each sub-surface edge, a set of sub-surface edge pixels is generated;

e. a score is determined for each said foreground pixel of said surface visible in each of said plurality of said 2D images;
f. at least one image edge is determined for each of said at least one best image;
g. for each at least one surface edge, a set of image edge pixels is generated;
h. a set of edge pixels is generated, said set of edge pixels comprising said set of image edge pixels and said set of sub-surface edge pixels;
i. for each said foreground pixel, said score is generated from a member of the group consisting of: a surface normal direction with respect to an optical axis of an imaging device, said imaging device having generated said 2D image; a correspondence between said point-cloud, and a position in said mesh; a depth border; said specularity; a semantic rule, and any combination thereof;
j. for a sequence of images, said score is modified according to spatial continuity over time;
k. for at least one element in a boundary region, data from neighboring imaging devices are merged via a pyramid blending algorithm; or
m. for at least one of said invisible point, said texture of said invisible point is modified using a member of the group consisting of said score, an alpha mask, and any combination thereof.

14. The program product of claim 8, wherein a set of in-element pixels is generated, each of said in-element pixels being a pixel with location mapping to a location within said element; and a texture is generated for each said element from a texture of at least one pixel in said set of in-element pixels; said texture being generated for each said element from the group consisting of a weighted average of said textures of said set of in-element pixels, an average of said textures of said set of in-element pixels, a texture of an in-element pixel with a highest score, a filtered texture of said set of in-element pixels, and any combination thereof.

15. The program product of claim 8, wherein at least one of the following is true:
a. at least two of said sub-surfaces are combined into a group according to at least one semantic rule;
b. for each foreground pixel in each of said plurality of said 2D images, a specularity value is determined, said specularity value determined from a comparison of color and brightness of said foreground pixel in a plurality of said images;
c. a score map for each of said plurality of said 2D images is determined, said score map having a score value for each foreground pixel in each of said plurality of said 2D images; or
d. texture is generated for each invisible point on said surface, said invisible point not being visible in any of said at least one 2D image at a given time, by means of a member of a group consisting of extending information from at least one foreground pixel on a visible portion of said surface on and near a boundary between said visible portion of said surface and said invisible portions of the surface; extrapolating information from at least one foreground pixel on a visible portion of said surface on and near a boundary between said visible portion of said surface and said invisible portions of the surface; copying texture from a model at a previous time, said point being visible at said previous time; copying texture from a model at a subsequent time, said point being visible at said subsequent time; applying a semantic rule, and any combination thereof.

* * * * *